US012075796B2

(12) United States Patent
Patterson et al.

(10) Patent No.: US 12,075,796 B2
(45) Date of Patent: *Sep. 3, 2024

(54) PASTRY FILLING FORMULATION AND PROCESS

(71) Applicant: Conagra Foods RDM, Inc., Chicago, IL (US)

(72) Inventors: Chloe C. Patterson, Omaha, NE (US); Meg Harris, Papillion, NE (US); Brian M. Degner, Yutan, NE (US); Jess C. Sweley, Elmhurst, IL (US); Matthew A. Junge, Omaha, NE (US)

(73) Assignee: Conagra Foods RDM, Inc., Chicago, IL (US)

( * ) Notice: Subject to any disclaimer, the term of this patent is extended or adjusted under 35 U.S.C. 154(b) by 321 days.

This patent is subject to a terminal disclaimer.

(21) Appl. No.: 17/369,019

(22) Filed: Jul. 7, 2021

(65) Prior Publication Data
US 2021/0337815 A1   Nov. 4, 2021

Related U.S. Application Data

(63) Continuation of application No. 17/307,062, filed on May 4, 2021.
(Continued)

(51) Int. Cl.
*A23L 19/00* (2016.01)
*A21D 13/32* (2017.01)
(Continued)

(52) U.S. Cl.
CPC .............. *A23G 3/42* (2013.01); *A21D 13/32* (2017.01); *A21D 13/38* (2017.01); *A21D 15/02* (2013.01);
(Continued)

(58) Field of Classification Search
CPC ................................ A23L 19/03; A21D 13/32
See application file for complete search history.

(56) References Cited

U.S. PATENT DOCUMENTS 3,300,316 A * 1/1967 Cooper .................. A23L 19/05
426/639
4,623,542 A 11/1986 Wallin et al.
(Continued)

FOREIGN PATENT DOCUMENTS

WO         0036930 A1    6/2000

OTHER PUBLICATIONS

Natural Products Insider, "Stabilizers, Naturally". Available online as of Oct. 1, 2007 from https://www.naturalproductsinsider.com/labstesting/stabilizers-naturally. pp. 1-6. (Year: 2007).*
(Continued)

*Primary Examiner* — Jenna A Watts
(74) *Attorney, Agent, or Firm* — Ryan T. Grace; Advent, LLP

(57) ABSTRACT

A pastry filling formulation and pastry food products including the pastry filling formulation are described having a freeze thaw stable thermoreversible gel with other ingredients including, but are not limited to, water, a sweetening agent, and one or more fruit additives (e.g., fruit flavor, fruit coloring, fruit puree, etc.). The freeze thaw stable thermoreversible gel permits the pastry filling to retain water during the thawing process from a frozen state.

19 Claims, 3 Drawing Sheets

Related U.S. Application Data

(60) Provisional application No. 63/019,638, filed on May 4, 2020.

(51) Int. Cl.
| | | |
|---|---|---|
| *A21D 13/38* | (2017.01) | |
| *A21D 15/02* | (2006.01) | |
| *A23G 3/34* | (2006.01) | |
| *A23G 3/42* | (2006.01) | |
| *A23G 3/48* | (2006.01) | |
| *A23G 9/32* | (2006.01) | |
| *A23G 9/34* | (2006.01) | |
| *A23G 9/42* | (2006.01) | |
| *A23L 29/212* | (2016.01) | |
| *A23L 29/238* | (2016.01) | |
| *A23L 29/269* | (2016.01) | |
| *A23L 29/30* | (2016.01) | |

(52) U.S. Cl.
CPC .............. *A23G 3/343* (2013.01); *A23G 3/48* (2013.01); *A23G 9/322* (2013.01); *A23G 9/34* (2013.01); *A23G 9/42* (2013.01); *A23L 19/03* (2016.08); *A23L 19/09* (2016.08); *A23L 29/212* (2016.08); *A23L 29/238* (2016.08); *A23L 29/27* (2016.08); *A23L 29/30* (2016.08); *A23V 2002/00* (2013.01)

(56) References Cited

U.S. PATENT DOCUMENTS

| | | | |
|---|---|---|---|
| 6,146,672 A * | 11/2000 | Gonzalez | A21D 13/31 426/94 |
| 2003/0124227 A1 | 7/2003 | Brown et al. | |
| 2010/0015296 A1 | 1/2010 | Meyer | |
| 2010/0104693 A1 | 4/2010 | Allen et al. | |
| 2011/0151057 A1* | 6/2011 | Sharma | A23C 9/123 426/61 |

OTHER PUBLICATIONS

Notification of Transmittal of the Internationalsearch Report and the Written Opinion of the International Searching Authority,or the Declaration dated Aug. 13, 2021 for App. No. PCT/US21/30663.

* cited by examiner

PASTRY FILLING FORMULATION AND PROCESS

CROSS-REFERENCE TO RELATED APPLICATIONS

The present application is a continuation under 35 U.S.C. § 120 of U.S. patent application Ser. No. 17/308,062, entitled, PASTRY FILLING FORMULATION AND PROCESS and filed May 4, 2021, which in turn claims the benefit under 35 U.S.C. § 119(e) of U.S. Provisional Application Ser. No. 63/019,638, entitled PASTRY FILLING FORMULATION AND PROCESS, filed May 4, 2020. U.S. Provisional Application Ser. No. 63/019,638 and U.S. patent application Ser. No. 17/308,062 are hereby incorporated by reference in their entireties.

BACKGROUND

Pastry food products are very popular for consumers. In particular, pastries provide consumers with options for sweet or savory food products available at varying temperatures, with cold or hot pastries often desired. For example, pastries can include pies having a crust that lines a dish or pan and is filled with sweet (e.g., fruit-based) or savory (e.g., protein-based) ingredients. However, ingredients used for storage of ready to eat (RTE) pastry products can limit storage options, and such ingredients can directly influence mouthfeel and flavor profiles of the food products for consumers differently based on a given food storage option.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of the disclosure pertain to a pastry filling formulation and a process for making the same. In an embodiment, a pastry filling formulation includes a freeze thaw stable thermoreversible gel in combination with ingredients for application to a pastry shell. The ingredients can include, but are not limited to, water, a sweetening agent, starch, salt, a food grade acid, and one or more fruit additives (e.g., fruit flavor, fruit coloring, fruit puree, etc.). The pastry filling formulation can be combined with fruit pieces applied to the pastry shell to permit the pastry filling formulation to set about the fruit pieces to provide a food product suitable for frozen storage and subsequent thawing (e.g., to a refrigerated temperature) without substantial syneresis of the pastry filling prior to consumption.

In an embodiment, a method for producing a pastry filling formulation includes combining dried filling ingredients with liquid ingredients in a liquefier blender to provide an initial filling slurry. The dried filling ingredients can include a sweetening agent, a combination of gums configured to provide a freeze thaw stable thermoreversible gel in the pastry filling, starch, and salt. The liquid ingredients can include water and a food grade color component. The method also includes introducing a fruit additive and water to the initial filling slurry and cooking the mixture at an elevated temperature to permit the freeze thaw stable thermoreversible gel to bloom. The method further includes introducing a food grade acid and additional sweetening agent at the elevated temperature to provide a gel filling. The gel filling is cooled to a second temperature above room temperature and a natural fruit flavoring is introduced to produce the pastry filling formulation.

In an embodiment, the pastry filling formulation is combined with additional components to provide a chilled pastry having fruit components for frozen storage and chilled consumption. For example, a fruit component is introduced to a baked pastry shell and the pastry filling formulation is deposited onto the frozen fruit component within the baked pastry shell to provide a filled pastry shell. The method further includes introducing a whipped topping component onto the surface of the filled pastry shell, such as following a cooling step, to provide a finished pastry. The finished pastry can then be frozen and packaged for distribution to consumers.

DRAWINGS

The detailed description is described with reference to the accompanying figures.

DETAILED DESCRIPTION

Figure 1:
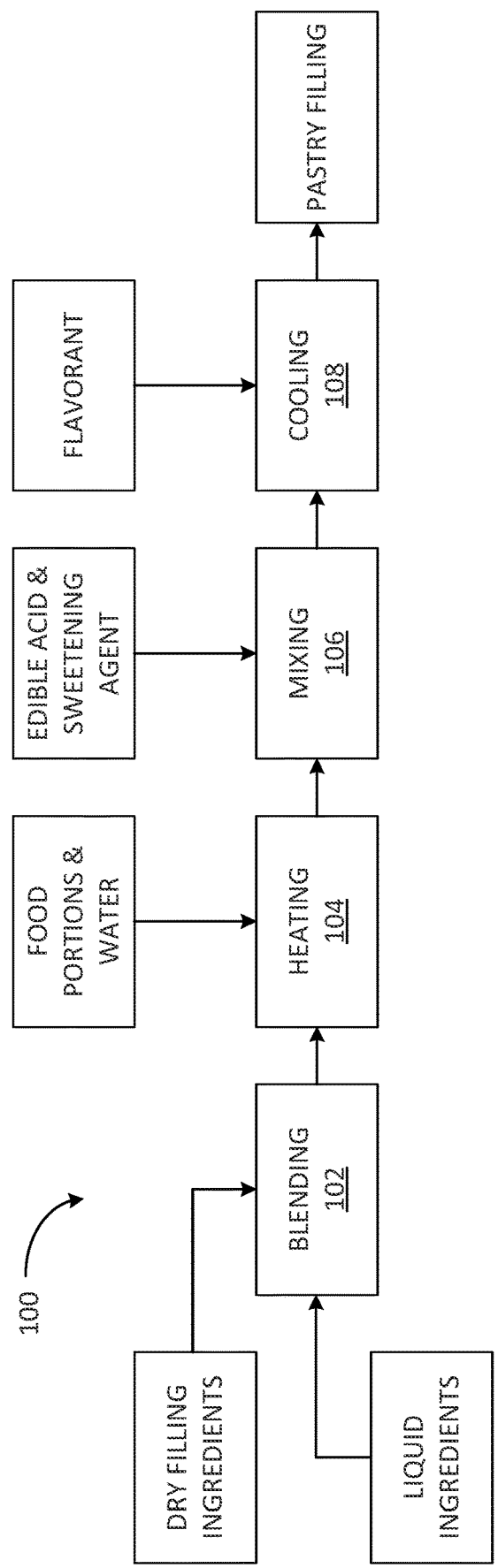
FIG. 1 is a flow diagram illustrating a method for producing a pastry filling formulation in accordance with example implementations of the present disclosure.

Features of the detailed description can be embodied in many different forms and should not be construed as limited to the combinations set forth herein; rather, these combinations are provided so that this disclosure will be thorough and complete, and will fully convey the scope. Among other things, the features of the disclosure can be embodied as formulations, food products, and methods of preparation thereof. The following detailed description is, therefore, not to be taken in a limiting sense.

Pastry food products can include sweet and/or savory food portions supported within a pastry shell by a filling. For example, fruit pies can include one or more varieties of fruit pieces, slices, chunks, or the like, supported within a pie crust by a pie filling. The filling can provide structure and body to the pastry during storage and consumption. The filling also contributes to the mouthfeel of the pastry, where the consistency of the filling can depend on storage and consumption conditions of the pastry. For example, for room temperature or chilled pastry food products, the filling can provide a gelatin-like mouthfeel with flavors and textures to support the taste, texture, and mouthfeel of the sweet or savory food portions added to the pastry. A diverse assortment of food products can be obtained by varying the characteristics of the pastry shell, filling, and added food portions. For example, a diverse assortment of pies can be achieved by varying the characteristics of the pie crust, pie filling, and added sweet food portions, savory food portions, and combinations thereof.

Pastry food products are available to consumers in a variety of packaging and storage options. For example, pastry food products can be provided as a room temperature product, a refrigerated or otherwise cooled product, a frozen food product, and the like. The storage conditions of the pastry can directly influence an eating experience of a consumer of the food product. For instance, pastry food products are often consumed in chilled or room temperature states to provide familiar mouthfeel and texture experiences for the consumer. When a pastry food product is stored in a frozen state, such as to provide an increased duration of food-safe storage as compared to refrigerated or room temperature storage, the pastry food product is traditionally permitted to warm to a chilled or room temperature prior to consumption. However, such transition between frozen and chilled or room temperature states negatively influences many traditional pastry fillings. For instance, gelatin provides many consumer-desirable traits for chilled and room temperature pastry food products, however gelatin proteins can break or otherwise deform during the freeze/thaw process, inhibiting the ability of the gelatin to retain water or other liquids within a pastry filling. The water therefore weeps out of the pastry filling and into the pastry crust or otherwise separates within the pastry, leading to poor mouthfeel and texture of the product, and ultimately resulting in a negative consumer eating experience.

Additionally, traditional pastry fillings can include negative attributes during commercial preparation and handling of the fillings. For instance, gelatin-based pastry fillings can conform to a water-like consistency or otherwise have a low viscosity during introduction of the filling to a pastry crust. Commercial filling equipment can be utilized to fill the pastry crust with the filling, such as onto food portions (e.g., fruit pieces) present in the pastry crust. The low viscosity of the gelatin-based pastry fillings can lead to splashing of the filling during the fill process when introduced into the pastry crust and during transition of the filling equipment to fill a next pastry crust as a result of carryover of the gelatin-based pastry fillings on and within head structures of the commercial filling equipment. Such splashing can lead to defective food products (e.g., with an improper amount of filling present), hazardous production facilities (e.g., due to the presence of fluid from food products on and around equipment), reduced throughput of food products through a commercial production facility (e.g., due to increased sanitation or cleaning operations), and the like.

Pastry filling formulations and pastry food products having unique combinations of features are provided herein. For example, pastry filling formulations are described, where the pastry filling formulations include a freeze thaw stable thermoreversible gel having consumer-preferable organoleptic qualities (e.g., mouthfeel, texture, etc.), where the freeze thaw stable thermoreversible gel is structured to retain water and other liquids within the pastry filling following a freeze/thaw cycle rather than allowing the water to weep out of the pastry filling. Additionally, the pastry filling formulations include characteristics that provide enhanced commercial-scale preparation of the pastry filling and associated pastry food products. For example, the pastry filling formulations can maintain a viscosity during a hot-fill process that is higher than gelatin-based filling compositions to prevent substantial splashing of the filling during introduction to a pastry crust and to prevent significant carryover of filling composition on filling heads of commercial filling equipment.

Aspects of the disclosure pertaining to pastry filling formulations are provided below. Example pastry food products and methods of preparation of pastry filling formulations and pastry food products are also provided herein. While particular examples herein are directed to pastry filling formulations including strawberries and strawberry flavors, it is noted that other or additional fruits, vegetables, nuts, seeds, and/or proteins can be utilized to produce similar pastry filling formulations and pastry food products generally described herein, including but not limited to, apples, blueberries, cherries, raspberries, cranberries, blackberries, boysenberries, peaches, apricots, pears, raisins, limes, lemons, rhubarbs, kiwis, bananas, and the like.

I. Ingredients of the Pastry Filling

The pastry filling formulation includes several ingredients. These ingredients can have a synergistic effect on the formulation as a whole. For example, the ingredients can form a freeze thaw stable thermoreversible gel during processing which can maintain cellular structure during freeze and thaw processes (e.g., during frozen storage and subsequent thawing to refrigerated or room temperatures) to retain water and other liquids during and subsequent to the thawing process. The ingredients of the pastry formulation also impart consumer-desirable organoleptic properties to the pastry filling typically associated with a gelatin-based filling composition while also maintaining properties desirable for industrial processing including, but not limited to, improved safety and throughput by avoiding splashing of filling during introduction of the filling to multiple pastry crusts. In general, the pastry filling formulation includes ingredients to provide the freeze thaw stable thermoreversible gel and to provide flavor and texture characteristics to the pastry filling, as described further herein. The pastry filling formulation can include additional ingredients, including, but not limited to, additives to maintain shelf life, to provide decoration or aesthetics, and the like.

A. Gums

The pastry filling formulation includes a blend of different gums to facilitate formation of a freeze thaw stable thermoreversible gel during processing of the filling. In various aspects, the gums contribute structure in the pastry filling formulation to build viscosity at warmer temperatures, allowing the freeze thaw stable thermoreversible gel to set at warmer temperatures as compared to gelatin-based filling compositions, while maintaining a glossy or transparent appearance. In various aspects, the pastry filling formulation begins to set at about 130° F. whereas gelatin-based fillings begin to set at about 60° F. Such warmer setting conditions permit pastry food products of the present disclosure to set at higher temperatures, and can remain in a set state with a translucent and glossy appearance during processing without intermittent chilling steps to reset the gel. The gums also contribute structure in the pastry filling formulation to prevent syneresis of the filling during thawing from a frozen state, which permits the filling to retain water within the filling as opposed to watering out during thawing from a frozen state. The gums further contribute structure in the pastry filling formulation to provide elasticity and a gelatin-like texture to the filling. The gums can include, but are not limited to, xanthan gum, locust bean gum, and guar gum. In one aspect, the pastry filling formulation includes a weight ratio of a first gum (e.g., xanthan gum, locust bean gum, guar gum) to a second gum differing from the first gum (e.g., a different one of xanthan gum, locust bean gum, and guar gum) from about 60 to about 40 first gum to about 40 to about 60 second gum (e.g., 60-40 first gum: 40-60 second gum). In another aspect, the weight ratio of first gum to second gum can be from about 30 to about 70 first gum to about 70 to about 30 second gum. For example, the weight ratio of first gum to second gum can be from about 30, 32, 34, 36, 38, 40, 42, 44, 46, 48, 50, 52, 54, 56, 58, 60, 62, 64, 66, 68, and 70 first gum to about 70, 68, 66, 64, 62, 60, 58, 56, 54, 52, 50, 48, 46, 44, 42, 40, 38, 36, 34, 32, and 30 second gum.

In an aspect, the pastry filling formulation includes equal portions by weight of locust bean gum and xanthan gum. Locust bean gum and xanthan gum interact in the pastry filling formulation to form a stronger gel than either gum individually in the ability to bind free water. Additionally, the gel formed with use of locust bean gum and xanthan gum is thermoreversible, such as being able to reform into a gel structure if cooled and reheated.

The pastry filling formulation includes the blend of different gums in an amount to facilitate formation of a freeze thaw stable thermoreversible gel during processing of the filling. In an aspect, the blend can include a first gum in a weight percentage of total content of the pastry filling from about 0.055% to about 0.125%. For example, the weight percentage of the first gum in the pastry filling formulation can be from about 0.055%, 0.060%, 0.065%, 0.070%, 0.075%, 0.080%, 0.085%, 0.090%, 0.095%, 0.100%, 0.105%, 0.110%, 0.115%, 0.120%, and 0.125% to about 0.055%, 0.060%, 0.065%, 0.070%, 0.075%, 0.080%, 0.085%, 0.090%, 0.095%, 0.100%, 0.105%, 0.110%, 0.115%, 0.120%, and 0.125%. In an aspect, the blend can additionally include a second gum in a weight percentage of total content of the pastry filling from about 0.055% to about 0.125%. For example, the weight percentage of the second gum in the pastry filling formulation can be from about 0.055%, 0.060%, 0.065%, 0.070%, 0.075%, 0.080%, 0.085%, 0.090%, 0.095%, 0.100%, 0.105%, 0.110%, 0.115%, 0.120%, and 0.125% to about 0.055%, 0.060%, 0.065%, 0.070%, 0.075%, 0.080%, 0.085%, 0.090%, 0.095%, 0.100%, 0.105%, 0.110%, 0.115%, 0.120%, and 0.125%. The amount of gums in the pastry filling formulation can facilitate a gelatin-like perception in the filling without having any gelatin present in the filling (e.g., due to the inability of the gelatin to remain stable and retain water during a freeze-thaw cycle). Additionally, the amount of gums in the pastry filling formulation can facilitate a firm setting of the pastry filling to maintain a clean slice, such as when a pastry food product is portioned into pieces (e.g., slices) for consumption.

B. Starch

The pastry filling formulation includes a starch to assist the blend of gums in formation of the freeze thaw stable thermoreversible gel during processing of the filling. The starch can include, but is not limited to, corn starch, modified corn starch, waxy corn starch, tapioca starch, or another starch suitable to provide the processing benefits for consumer scale or commercial scale described herein. The starch can also facilitate preparation of the freeze thaw stable thermoreversible gel having desirable organoleptic traits. For example, the starch can contribute to providing a desired consumer mouthfeel during consumption (e.g., providing a melt-in-mouth texture), such as an experience typically associated with a gelatin-based pastry, but without including gelatin. In an aspect, the starch can assist the blend of gums in providing a firm setting of the pastry filling while maintain a structure that is not perceived as brittle or overly elastic or stringy. The combination of the starch and blend of gums create a unique pastry filling that is substantially translucent while simultaneously retaining color, flavor, and water during freeze-thaw cycles. In one aspect, the pastry filling formulation includes the starch in a weight percentage of the pastry filling formulation from about 3.0% to about 4.5%. In another aspect, the pastry filling formulation includes waxy corn starch in a weight percentage of the pastry filling formulation from about 3.0% to about 4.5%. For example, the weight percentage of the waxy corn starch in the pastry filling formulation can be from about 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, and 4.5% to about 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, and 4.5%.

C. Sweetening Agent

The pastry filling formulation includes a sweetening agent, such as granulated sugar, liquid sugar, corn syrup, and the like. The sweetening agent can provide sweetness and flavor to the pastry filling. Additionally, the sweetening agent can assist in controlling the flow of free water in the pastry filling and contributes to providing a favorable viscosity during commercial processing of the pastry filling formulation. Further, a granulated sweetening agent (e.g., granulated cane sugar) can assist with dissolution of the blend of gums into water during preparation of the freeze thaw stable thermoreversible gel. In one aspect, the pastry filling formulation includes the sweetening agent in a weight percentage of the pastry filling formulation from about 30% to about 40%. In another aspect, the pastry filling formulation includes granulated sugar in a weight percentage of the pastry filling formulation from about 30% to about 40%. For example, the weight percentage of the granulated sugar in the pastry filling formulation can be from about 30%, 30.5%, 31%, 31.5%, 32%, 32.5%, 33%, 33.5%, 34%, 34.5%, 35%, 35.5%, 36%, 36.5%, 37%, 37.5%, 38%, 39.5%, and 40% to about 30%, 30.5%, 31%, 31.5%, 32%, 32.5%, 33%, 33.5%, 34%, 34.5%, 35%, 35.5%, 36%, 36.5%, 37%, 37.5%, 38%, 39.5%, and 40%.

D. Food Grade Acid

The pastry filling formulation includes a food grade acid, such as citric acid, malic acid, tartaric acid, and the like. The food grade acid can decrease the pH of the pastry filling formulation, which can enhance the flavor and coloration of the filling. For example, citric acid can be added to brighten coloration of added fruit portions to provide a bright color and a fresh flavor. In one aspect, the pastry filling formulation includes the food grade acid in a weight percentage of the pastry filling formulation from about 0.35% to about 0.50%. In another aspect, the pastry filling formulation includes citric acid in a weight percentage of the pastry filling formulation from about 0.35% to about 0.50%. For example, the weight percentage of citric acid in the pastry filling formulation can be from about 0.35%, 0.36%, 0.37%, 0.38%, 0.39%, 0.40%, 0.41%, 0.42%, 0.43%, 0.44%, 0.45%, 0.46%, 0.47%, 0.48%, 0.49%, and 0.50% to about 0.35%, 0.36%, 0.37%, 0.38%, 0.39%, 0.40%, 0.41%, 0.42%, 0.43%, 0.44%, 0.45%, 0.46%, 0.47%, 0.48%, 0.49%, and 0.50%.

D. Salt

The pastry filling formulation includes a salt, such as a granulated salt. The salt can serve as a flavor enhancer of the filling. The salt also facilitates controlling free water in the pastry filling during the freeze-thaw cycle. The salt can include various types (e.g., sea salt, kosher salt, rock salt, and the like) and sizes (e.g., finely ground salt, flour-cut salt, pulverized salt, and the like) of salts. In one aspect, the pastry filling formulation includes the salt in a weight percentage of the pastry filling formulation from about 0.10% to about 0.30%. For example, the weight percentage of salt in the pastry filling formulation can be from about 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27%, 0.28%, 0.29%, and 0.30% to about 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27%, 0.28%, 0.29%, and 0.30%.

E. Flavors, Colors, and Other Ingredients

The pastry filling formulation can include a variety of ingredients to provide for a diverse assortment of flavor and color combinations, which depend on the desired end pastry food product. For example, the pastry filling formulation can include, but is not limited to, food grade color additives, food grade flavor additives, fruit portions, vegetable portions, and the like, individually or in combination. In an aspect, the pastry filling formulation includes a fruit portion in a weight percentage of the pastry filling formulation from about 5% to about 15%. In another aspect, the pastry filling formulation includes strawberry fruit portions (e.g., frozen, sliced, puree, etc.) in a weight percentage of the pastry filling formulation from about 5% to about 15%. For example, the weight percentage of strawberry fruit portions in the pastry filling formulation can be from about 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, and 15% to about 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, and 15%.

The pastry filling formulation can include food grade flavor and color additives to provide a consistent flavor and color across multiple commercial batches of the pastry filling. For instance, when strawberry pastry filling is being produced with commercial food production facilities, the composition of strawberries received to produce multiple commercial batches can vary depending on the harvest season, berry farm location, berry farm soil conditions, berry farm weather conditions, and other factors. Natural or artificial strawberry flavor and color additives can be added during production of the pastry filling to provide uniformity between batches. In an aspect, the pastry filling formulation includes food grade coloring (e.g., natural red coloring) in a weight percentage of the pastry filling formulation from about 0.0050% to about 0.0060%. For example, the weight percentage of food grade coloring in the pastry filling formulation can be from about 0.0050%, 0.0051%, 0.0052%, 0.0053%, 0.0054%, 0.0055%, 0.0056%, 0.0057%, 0.0058%, 0.0059%, and 0.0060% to about 0.0050%, 0.0051%, 0.0052%, 0.0053%, 0.0054%, 0.0055%, 0.0056%, 0.0057%, 0.0058%, 0.0059%, and 0.0060%. In an aspect, the pastry filling formulation includes food grade flavoring (e.g., natural strawberry flavor) in a weight percentage of the pastry filling formulation from about 0.045% to about 0.060%. For example, the weight percentage of food grade coloring in the pastry filling formulation can be from about 0.045%, 0.046%, 0.047%, 0.048%, 0.049%, 0.050%, 0.051%, 0.052%, 0.053%, 0.054%, 0.055%, 0.056%, 0.057%, 0.058%, 0.059%, and 0.060% to about 0.045%, 0.046%, 0.047%, 0.048%, 0.049%, 0.050%, 0.051%, 0.052%, 0.053%, 0.054%, 0.055%, 0.056%, 0.057%, 0.058%, 0.059%, and 0.060%.

F. Water

The pastry filling formulation includes water as a base for the filling. The water also imparts translucent characteristics to the filling once set. In an aspect, the pastry filling formulation includes water in a weight percentage of the pastry filling formulation from about 40% to about 60%. In another aspect, the pastry filling formulation includes water in a weight percentage of the pastry filling formulation from about 45% to about 55%. For example, the weight percentage of water in the pastry filling formulation can be from about 45%, 45.5%, 46%, 46.5%, 47%, 47.5%, 48%, 48.5%, 49%, 49.5%, 50%, 50.5%, 51%, 51.5%, 52%, 52.5%, 53%, 53.5%, 54%, 54.5%, and 55% to about 45%, 45.5%, 46%, 46.5%, 47%, 47.5%, 48%, 48.5%, 49%, 49.5%, 50%, 50.5%, 51%, 51.5%, 52%, 52.5%, 53%, 53.5%, 54%, 54.5%, and 55%.

II. Additional Ingredients for a Pastry Food Product

The pastry filling formulation can be added to additional ingredients to produce a pastry food product. The additional ingredients depend on the desired end pastry food product, and can include, but are not limited to, a pastry crust, fruit portions, vegetable portions, whipped toppings, cream toppings, chocolate syrups, caramel syrups, seasonings, spices, and the like, individually or in combination. For example, a strawberry fruit pie can include a pie crust with strawberries included within the pie crust with the pastry filling formulation introduced within the pie crust. A whipped topping can be introduced to at least a portion of the surface of the pastry filling to provide a finished strawberry pie suitable for frozen storage with stability in water retention, texture, mouthfeel, and flavor following thawing from a frozen state to a refrigerated state prior to consumption.

III. Pastry Filling Production Process

Referring to FIG. 1, a process 100 is shown for producing a pastry filling. The process 100 includes introducing dry filling ingredients and liquid ingredients to a blender and blending the ingredients to provide an initial filling slurry in operation 102. The blender can include a liquefier blender to mix the ingredients for a first duration. For example, in an aspect, the liquefier blender mixes the dry filling ingredients and liquid ingredients for approximately five minutes to provide the initial filling slurry. The dry filling ingredients can include, but are not limited to, a sweetening agent, a combination of gums configured to provide a freeze thaw stable thermoreversible gel in the pastry filling, starch, and salt. The dry ingredients are introduced in amounts to provide the weight percentage in the pastry filling formulation described herein. In an aspect, the sweetening agent is introduced in multiple steps of the process 100. For example, for the initial filling slurry, granulated sugar is introduced in an amount to provide about 13.8% by weight of the pastry filling formulation. Additional sugar is introduced later during the process 100 to bring the total amount of sugar present in the pastry filling formulation to a weight percentage from about 30% to about 40%. The liquid ingredients can include water and a food grade color component (e.g., natural strawberry coloring). In an aspect, water is introduced in multiple steps of the process 100. For example, for the initial filling slurry, water is introduced in an amount to provide from about 20% to about 30% by weight of the pastry filling formulation.

The process 100 then proceeds to operation 104 where the initial filling slurry is introduced to a heating vessel to cook the initial filling slurry with additional ingredients. For example, the initial filling slurry can be transferred to a kettle cooker having an agitator, where strawberry portions (e.g., strawberry puree) and water are introduced. In an aspect, water is introduced in an amount to provide from about 20% to about 30% by weight of the pastry filling formulation. In an aspect, the heating vessel operates at a temperature from about 175° F. to about 195° F. For example, the kettle cooker can be operated at a temperature of about 185° F. with low agitation active. The operation 104 can also include holding the mixture within the heating vessel for a duration to permit the gums/starch to bloom. For example, the kettle cooker can hold the mixture for about five minutes to allow the starch and blend of gums combination to bloom. In an aspect, during the blooming process, the heating vessel is brought to a temperature less than the initial cooking temperature, or is otherwise permitted to cool during blooming. Following blooming, the kettle cooker is then heated back to the initial cooking temperature (e.g., 185° F.) and citric acid and sugar are added in operation 106 to provide a color-brightened mixture. The amount of sugar added in operation 106 brings the total amount of sugar present in the pastry filling formulation to a weight percentage from about 30% to about 40%. For example, for aspects where about 13.8% by weight of the pastry filling formulation of sugar is added during operation 102, the amount of sugar added in operation 106 is about 21.7% by weight of the pastry filling formulation.

The process 100 then proceeds to operation 108 where the color-brightened mixture is cooled and a flavoring agent is introduced to provide the pastry filling. In an aspect, the color-brightened mixture is cooled to a temperature in a range from about 150° F. to about 170° F. and strawberry flavoring is introduced. In an aspect, the kettle cooker is cooled to a temperature of about 160° F. and natural strawberry flavoring is introduced. Adding strawberry flavoring toward the end of the pastry filling formulation process can maintain the intensity of flavor as opposed to adding the flavoring prior to cooking steps, where the flavoring can lose intensity of flavor or break down in structure during or following the period of heating or cooking. Following addition of the strawberry flavoring, a base pastry filling is prepared and maintained in a substantially fluid state for storage or sales (e.g., introduced to large volume storage vessel or transport vessel, introduced to individual storage containers, or the like), or for introduction to additional food product ingredients to provide a variety of food products.

Figure 2:
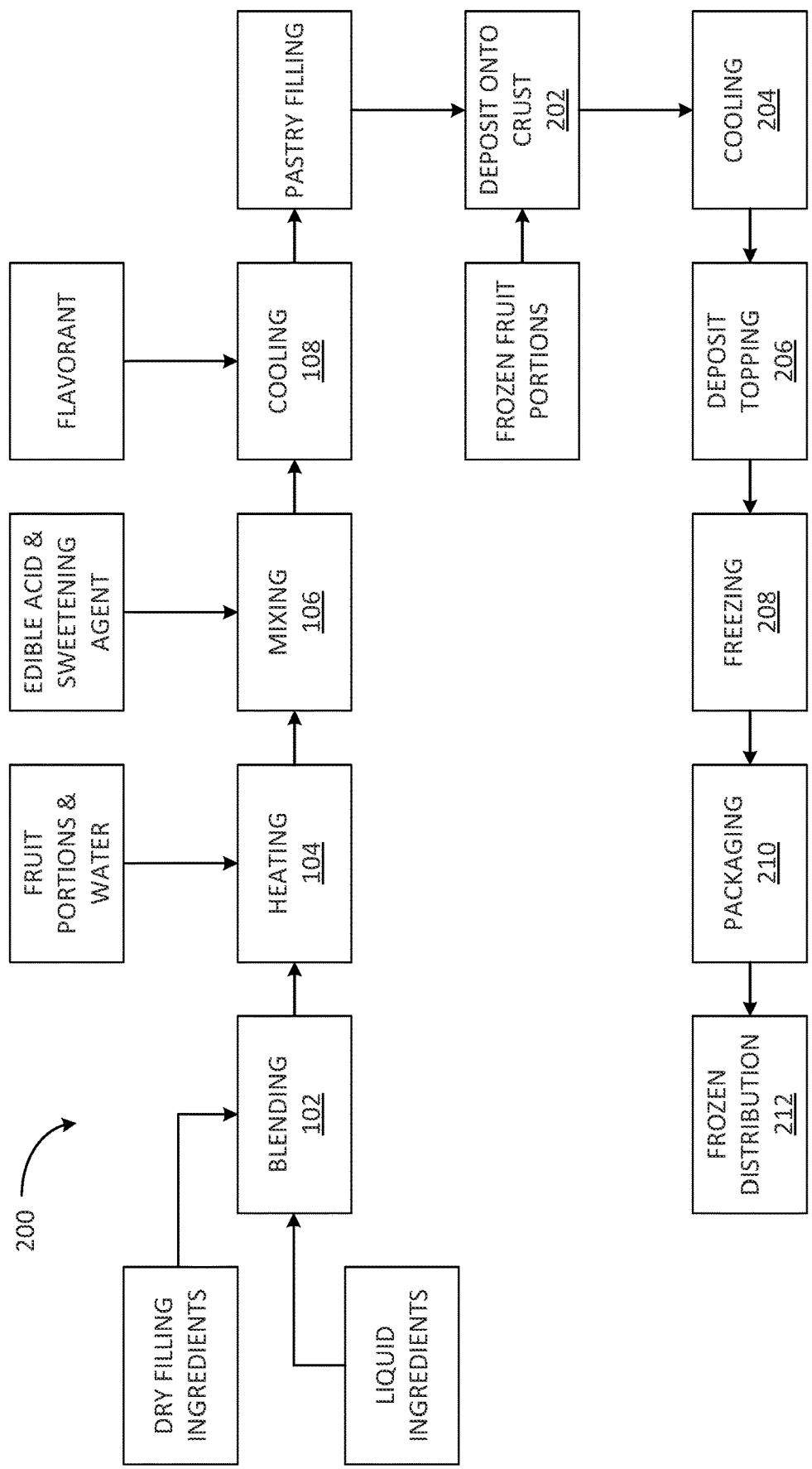
FIG. 2 is a flow diagram illustrating a method for producing a pastry food product in accordance with example implementations of the present disclosure.
Figure 3:
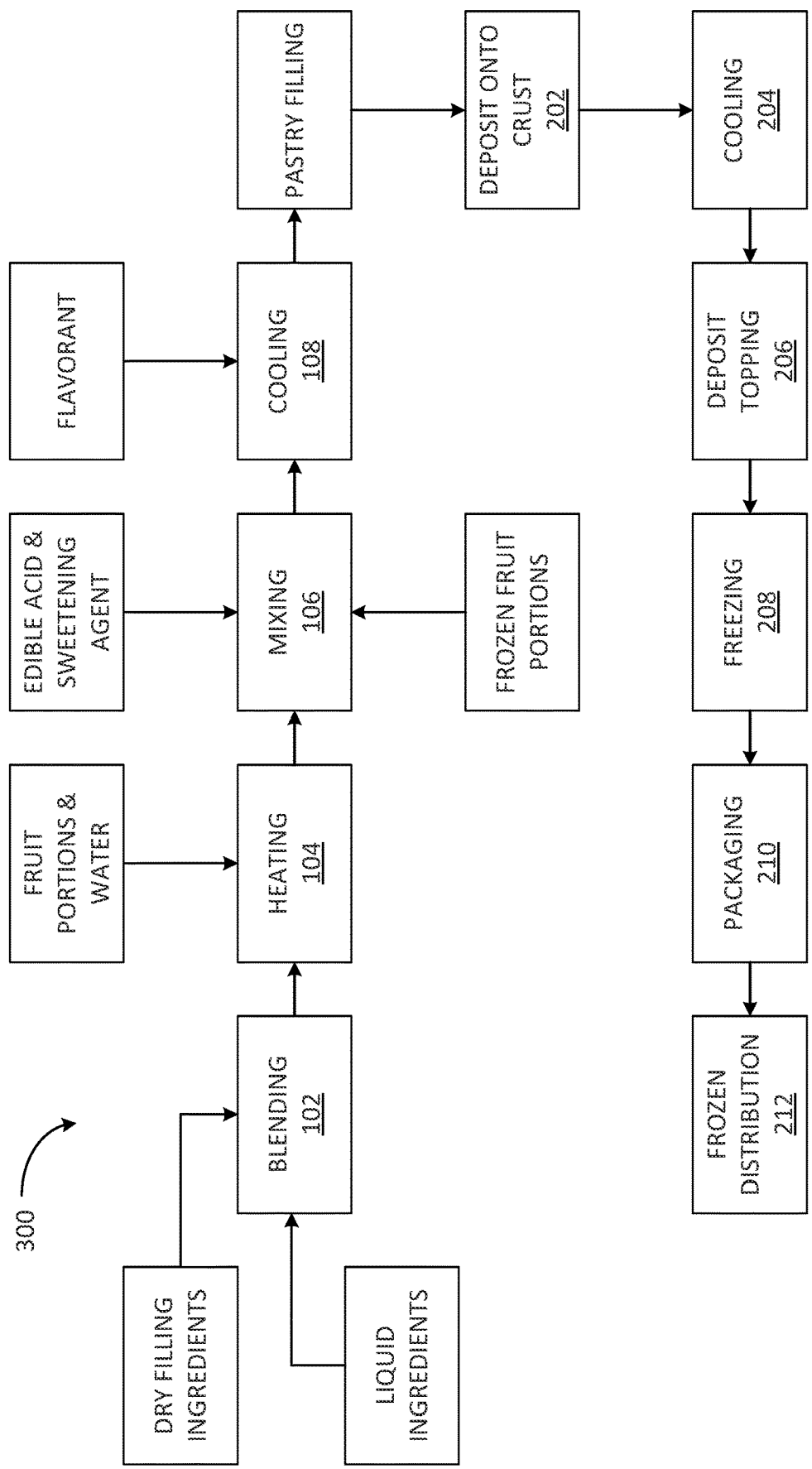
FIG. 3 is a flow diagram illustrating a method for producing a pastry food product in accordance with example implementations of the present disclosure.

In an aspect, the process 100 includes additional operational steps to introduce the pastry filling to other ingredients to provide a pastry food product. For example, referring to FIG. 2, a process 200 is shown for producing a pastry food product, such as a fruit pie. The process 200 generally includes operations 102, 104, 106, and 108 described with respect to FIG. 1. The process 200 further includes introducing the pastry filling and additional fruit portions to a pastry crust in operation 202. In an aspect, frozen strawberry pieces are introduced to the interior volume of a baked pastry crust and the pastry filling is deposited on top of the frozen strawberry pieces. For example, the frozen strawberry pieces can include IQF (individually quick-frozen) sliced strawberries. Alternatively or additionally, additional fruit portions are added in operation 104 (e.g., shown in process 300 of FIG. 3) to provide a pastry filling having additional fruit portions that can be deposited into the pastry crust. For example, the additional fruit pieces can include frozen strawberry pieces (e.g., IQF sliced strawberries) added to the mixture within the heating vessel during operation 104. In an aspect, the additional fruit pieces are added following during or subsequent to the blooming process of the mixture.

In an aspect, the pastry filling is deposited at an elevated temperature that exceeds ambient temperature conditions (e.g., hot-deposited at temperatures above 100° F.) within the interior volume of a baked pie crust onto the IQF sliced strawberries with a piston-based filling apparatus having a rotating head. The pastry filling formulation maintains a viscosity during a hot-fill process that is higher than gelatin-based filling compositions, thereby preventing substantial splashing of the filling during introduction to the pastry crust. Further, the pastry filling formulation prevents significant carryover of filling on the filling heads of commercial filling equipment, where gelatin-based fillings have been found to carryover on the filling heads to contaminate the production area, conveyance systems, adjacent food products, and the like.

The process 200 (or 300) then proceeds to operation 204 where the filled pastry is cooled to prepare for introduction of cooled toppings. In an aspect, the filled pastry is cooled to a temperature in a range from about 80° F. to about 100° F. via a cooling unit (e.g., a spiral cooler). Higher temperatures can melt various toppings upon application to the filled pastry and are therefore generally avoided. The process 200 (or 300) then proceeds to operation 206 where a cooled topping is introduced to a surface of the filled pastry to provide the pastry food product. In an aspect, a whipped dairy topping is introduced to at least a portion of a top surface of the strawberry pie. The process 200 (or 300) then proceeds to operation 208 where the pastry food product is frozen, and subsequently transferred to a packaging system where the frozen pastry food product is packaged in operation 210. The packaged frozen pastry food product can then be palletized and maintained in a frozen state in operation 212 for distribution through frozen food distribution channels.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for preparing a pastry food product, comprising:
   introducing a plurality of gums having at least a first gum and a second gum of a type differing from the first gum, a starch, a first portion of a sweetening agent, a salt, and a first portion of water to a blender, the plurality of gums having a weight ratio of the first gum to the second gum of about 30 to about 70 first gum to about 70 to about 30 second gum, and the plurality of gums including at least two of xanthan gum, locust bean gum, and guar gum;
   mixing, via the blender, the plurality of gums, the starch, the sweetening agent, the salt, and the water to provide an initial filling slurry;
   transferring the initial filling slurry to a heater;
   introducing a second portion of water and a fruit additive to the initial filling slurry in the heater;
   heating the initial filling slurry to provide a freeze thaw stable thermoreversible gel;
   mixing a second portion of sweetening agent with the freeze thaw stable thermoreversible gel;
   cooling the freeze thaw stable thermoreversible gel to provide a pastry filling, the pastry filling consisting essentially of the plurality of gums, the starch, the sweetening agent, the salt, the water, and the fruit additive; and
   introducing the pastry filling to a pastry crust to provide a pastry food product.

2. The method of claim 1, wherein the plurality of gums has a weight ratio of the first gum to the second gum of about 40 to about 60 first gum to about 60 to about 40 second gum.

3. The method of claim 1, wherein the starch has a weight percentage of the pastry filling from about 3.0% to about 4.5%.

4. The method of claim 1, wherein the first portion of sweetening agent and the second portion of sweetening agent together have a weight percentage of the pastry filling from about 30% to about 40%.

5. The method of claim 1, wherein the first portion of water and the second portion of water together have a weight percentage of the pastry filling from about 40% to about 60%.

6. The method of claim 1, further comprising introducing a food grade flavoring additive to the pastry filling subsequent to cooling the freeze thaw stable thermoreversible gel.

7. The method of claim 1, wherein the fruit additive includes at least one of a frozen fruit, a sliced fruit, or a pureed fruit and is present in the pastry filling in an amount having a weight percentage of the pastry filling from about 5% to about 15%.

8. The method of claim 1, wherein the pastry filling has an initial setting temperature of about 130° F.

9. The method of claim 1, wherein the pastry food product includes no gelatin.

10. The method of claim 1, wherein mixing a second portion of sweetening agent with the freeze thaw stable thermoreversible gel includes mixing a second portion of sweetening agent and a food grade acid with the freeze thaw stable thermoreversible gel.

11. The method of claim 1, wherein introducing the pastry filling to a pastry crust includes introducing the pastry filling and a portion of fruit to a pastry crust, the portion of fruit at least partially covered by the pastry filling to provide the pastry food product.

12. The method of claim 11, further comprising cooling the pastry food product; and
introducing a whipped topping to a top surface of the pastry filling of the pastry food product.

13. The method of claim 1, further comprising freezing the pastry food product.

14. A method for preparing a pastry food product, comprising:
introducing a plurality of gums having at least a first gum and a second gum of a type differing from the first gum, a starch, a first portion of a sweetening agent, a salt, and a first portion of water to a blender, the plurality of gums having a weight ratio of the first gum to the second gum of about 30 to about 70 first gum to about 70 to about 30 second gum, and the plurality of gums including at least two of xanthan gum, locust bean gum, and guar gum;
mixing, via the blender, the plurality of gums, the starch, the sweetening agent, the salt, and the water to provide an initial filling slurry;
transferring the initial filling slurry to a heater;
introducing a second portion of water and a fruit additive to the initial filling slurry in the heater;
heating the initial filling slurry to provide a freeze thaw stable thermoreversible gel;
mixing a second portion of sweetening agent with the freeze thaw stable thermoreversible gel, wherein the first portion of sweetening agent and the second portion of sweetening agent together have a weight percentage of the pastry filling from about 30% to about 40%;
cooling the freeze thaw stable thermoreversible gel to provide a pastry filling, the pastry filling consisting essentially of the plurality of gums, the starch, the sweetening agent, the salt, the water, and the fruit additive;
introducing the pastry filling to a pastry crust to provide a pastry food product; and
freezing the pastry food product.

15. The method of claim 14, wherein the plurality of gums has a weight ratio of the first gum to the second gum of about 40 to about 60 first gum to about 60 to about 40 second gum.

16. The method of claim 14, wherein the starch has a weight percentage of the pastry filling from about 3.0% to about 4.5%.

17. The method of claim 14, wherein the first portion of water and the second portion of water together have a weight percentage of the pastry filling from about 40% to about 60%.

18. The method of claim 14, wherein the pastry filling has an initial setting temperature of about 130° F.

19. The method of claim 14, wherein mixing a second portion of sweetening agent with the freeze thaw stable thermoreversible gel includes mixing a second portion of sweetening agent and a food grade acid with the freeze thaw stable thermoreversible gel.

\* \* \* \* \*